(12) United States Patent
Bakthavathsalam

(10) Patent No.: US 7,917,682 B2
(45) Date of Patent: Mar. 29, 2011

(54) MULTI-PROTOCOL CONTROLLER THAT SUPPORTS PCIE, SAS AND ENHANCED ETHERNET

(75) Inventor: Ranga Bakthavathsalam, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 191 days.

(21) Appl. No.: 11/823,636

(22) Filed: Jun. 27, 2007

(65) Prior Publication Data
US 2009/0003361 A1    Jan. 1, 2009

(51) Int. Cl.
G06F 13/36    (2006.01)
(52) U.S. Cl. .................................................. 710/315
(58) Field of Classification Search ............... 710/315, 710/306
See application file for complete search history.

(56) References Cited

U.S. PATENT DOCUMENTS

| | | | |
|---|---|---|---|
| 6,400,730 B1 * | 6/2002 | Latif et al. ................ | 370/466 |
| 6,578,084 B1 * | 6/2003 | Moberg et al. ............. | 709/236 |
| 6,601,101 B1 * | 7/2003 | Lee et al. .................. | 709/227 |
| 6,738,821 B1 * | 5/2004 | Wilson et al. .............. | 709/230 |
| 6,766,412 B2 * | 7/2004 | Bolt .......................... | 711/111 |
| 6,795,849 B1 * | 9/2004 | Hamlin ...................... | 709/213 |
| 6,807,581 B1 * | 10/2004 | Starr et al. ................. | 709/250 |
| 6,895,461 B1 * | 5/2005 | Thompson ................. | 710/305 |
| 6,920,491 B2 * | 7/2005 | Kim ........................... | 709/220 |
| 6,959,007 B1 * | 10/2005 | Vogel et al. ................ | 370/469 |
| 6,975,637 B1 | 12/2005 | Lenell | |
| 7,174,413 B2 * | 2/2007 | Pettey et al. ............... | 710/317 |
| 7,310,696 B1 * | 12/2007 | Haechten et al. .......... | 710/311 |
| 7,310,742 B2 * | 12/2007 | Zimmer et al. ............ | 714/5 |
| 7,362,709 B1 * | 4/2008 | Hui et al. ................... | 370/237 |
| 7,386,674 B1 * | 6/2008 | Lango ........................ | 711/137 |
| 7,437,738 B2 * | 10/2008 | Shah et al. ................. | 719/321 |
| 7,464,174 B1 * | 12/2008 | Ngai .......................... | 709/234 |
| 7,500,071 B2 * | 3/2009 | Boyd et al. ................ | 711/163 |
| 7,509,436 B1 * | 3/2009 | Rissmeyer ................. | 709/249 |
| 7,512,663 B1 * | 3/2009 | Kodama et al. ........... | 709/212 |
| 2003/0105830 A1 * | 6/2003 | Pham et al. ................ | 709/216 |
| 2003/0177174 A1 * | 9/2003 | Allen et al. ................ | 709/203 |
| 2004/0010545 A1 * | 1/2004 | Pandya ...................... | 709/203 |
| 2004/0143734 A1 * | 7/2004 | Buer et al. ................. | 713/153 |
| 2005/0013317 A1 | 1/2005 | Lindsay et al. | |
| 2005/0238035 A1 * | 10/2005 | Riley ......................... | 370/401 |
| 2006/0004935 A1 * | 1/2006 | Seto et al. .................. | 710/62 |

(Continued)

FOREIGN PATENT DOCUMENTS

EP    781020 A2 *   6/1997

*Primary Examiner* — Paul R Myers
(74) *Attorney, Agent, or Firm* — Morrison & Foerster LLP

(57) ABSTRACT

SAS over Enhanced Ethernet (SOE) controllers that integrate SAS and Enhanced Ethernet to perform a conversion between SAS and Enhanced Ethernet are disclosed. A central intelligence block can be employed to perform the mapping between SAS and Enhanced Ethernet. The SOE controller can include one or more Enhanced Ethernet Interfaces, one or more SAS interfaces, and a PCIe interface. The SOE controller can direct the I/O requests presented on one interface to another interface after performing some basic operations on the I/O requests, including protocol conversion. The SOE controller can include an intelligence mechanism for identifying the appropriate output ports for routing the I/O requests and redirecting them accordingly. In the case of routing I/O requests over Enhanced Ethernet, the SOE controller can perform SAS protocol conversion to map outgoing I/O requests into Enhanced Ethernet frames suitable for transmission over the Enhanced Ethernet network.

24 Claims, 13 Drawing Sheets

U.S. PATENT DOCUMENTS

| | | |
|---|---|---|
| 2006/0050645 A1* | 3/2006 | Chappell et al. .............. 370/252 |
| 2006/0112216 A1* | 5/2006 | Bashford et al. .............. 711/105 |
| 2006/0126612 A1* | 6/2006 | Sandy et al. ................... 370/389 |
| 2006/0248241 A1* | 11/2006 | Danilak ........................... 710/36 |
| 2006/0271639 A1* | 11/2006 | Kumagai et al. .............. 709/217 |
| 2007/0050591 A1* | 3/2007 | Boyd et al. ..................... 711/171 |
| 2008/0107188 A1* | 5/2008 | Kennedy et al. .............. 375/259 |
| 2008/0126696 A1* | 5/2008 | Holland et al. ................ 711/114 |
| 2008/0195747 A1* | 8/2008 | Elmaliah ........................ 709/232 |
| 2008/0228897 A1* | 9/2008 | Ko .................................. 709/213 |

\* cited by examiner

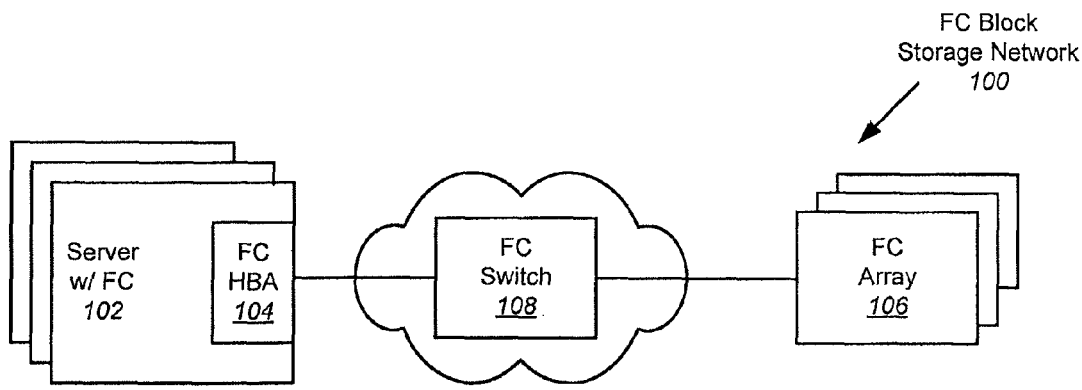
FIG. 1a - Prior Art -
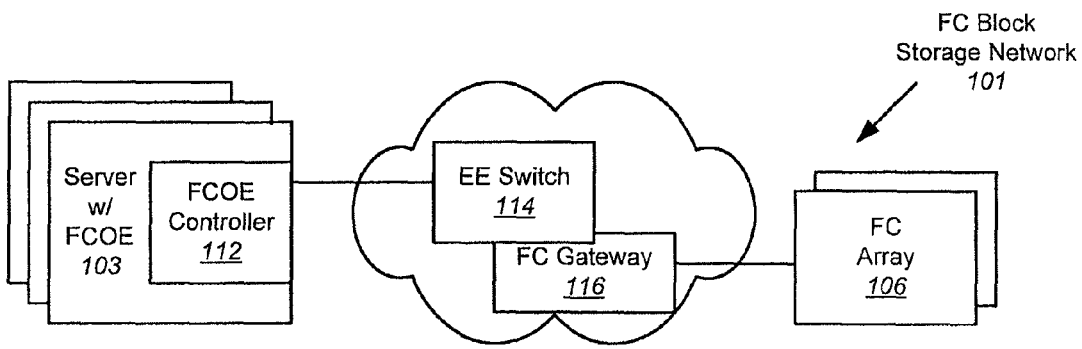
FIG. 1b - Prior Art -
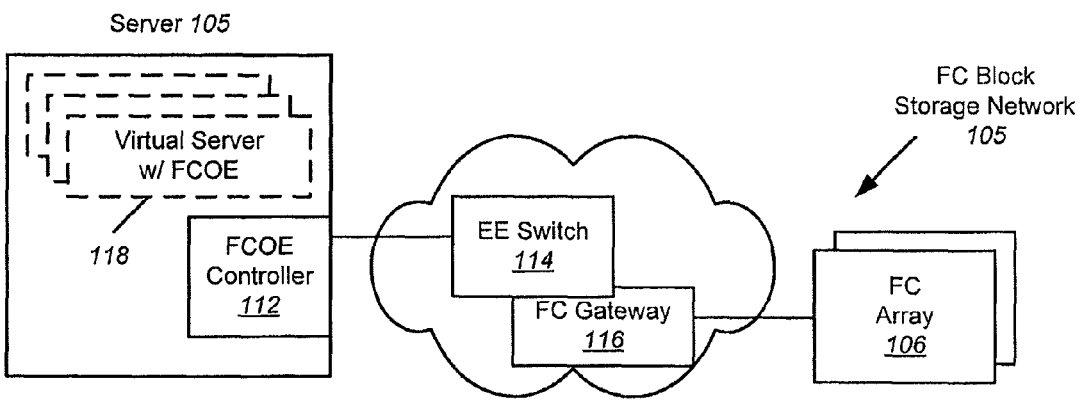
FIG. 1c - Prior Art -

MULTI-PROTOCOL CONTROLLER THAT SUPPORTS PCIE, SAS AND ENHANCED ETHERNET

FIELD OF THE INVENTION

This invention relates to communications over networks, and more particularly, to a controller for encapsulating and de-encapsulating Serial Attached Small Computer System Interconnect (SAS) ordered sets within Enhanced Ethernet frames over Ethernet networks that utilize storage arrays with SAS disk drives.

BACKGROUND OF THE INVENTION

Improvements in the processing power of computers, storage systems, and the data intensive nature of enterprise applications have created a demand for access to high performance storage. While the external storage devices were initially based on the Small Computer System Interconnect (SCSI) standard, this technology, which uses a parallel interface, suffers from significant drawbacks in terms in speed and distance. Fibre Channel (FC) is a serial transport protocol developed for providing faster connectivity between computers and mass storage devices separated over larger distances. In FC, SCSI commands are encapsulated within FC frames and transported over FC links in FC SANs.

SAS is a relatively new serial protocol intended to replace parallel SCSI within an enterprise host or computer. SAS is specified in the American National Standard Institute standard referred to as Serial-attached SCSI, also known as ANSI/INCITS 376-2003, the contents of which are incorporated by reference herein. Both FC and SAS use 8b10b encoding and similar ordered sets. SAS employs a shared infrastructure with the ability to create a point-to-point connection between two devices through which data may be transferred without interruption. The SAS market is gaining increasing adoption, and SAS is becoming well-established in servers and internal storage. However, SAS is not expected to replace FC or Internet SCSI (iSCSI) as a network protocol due to the clear lack of maturity of SAS in the switching domain.

Classic Ethernet technology, on the other hand, has a very well-established and widely deployed switching infrastructure. This Ethernet infrastructure, however, suffers from a significant drawback in that it may lose frames due to congestion in network. Because of this unreliable nature of frame delivery, Ethernet technology was not natively used to transport storage I/O traffic. To overcome the unreliability, the iSCSI protocol was built using TCP/IP as a transport layer to carry storage I/O traffic over the unreliable Ethernet network.

Some of the drawbacks of classic Ethernet are addressed in advances by the IEEE. Enhanced Ethernet, being developed by the IEEE, provides per priority flow control and enhanced buffer management for congestion avoidance. The use of per priority flow control can enable separate classes of to be prioritized through the network depending on the importance of the data. In Enhanced Ethernet, the standard Ethernet frame is enhanced to carry this additional information, which will aid in overcoming the current drawbacks.

The emergence of Enhanced Ethernet provides a high bandwidth, low latency network that is highly suitable for carrying both regular Ethernet and storage traffic. Accordingly, there are techniques currently under development for carrying storage traffic over Enhanced Ethernet by encapsulating FC frames within Enhanced Ethernet (referred to as FC over Ethernet, or FCOE). FCOE is disclosed, for example, in U.S. Patent Application Publication No. 2006/0098681 filed on Mar. 10, 2005 and entitled "Fibre Channel Over Ethernet," and U.S. patent application Ser. No. 11/514,665 filed on Sep. 1, 2006 and entitled "Fibre Channel Over Ethernet," the contents of both which are incorporated by reference herein.

FIG. 1a illustrates exemplary conventional enterprise FC block storage network 100, with one or more physical servers 102, each with host bus adapter (HBA) 104 connected to one or more FC arrays 106 through FC switch 108. Any I/O requests from the server are sent through HBA 104 and FC switch 108 to disk drives in the FC array.

FIG. 1b illustrates exemplary proposed enterprise FCOE block storage network 101, with one or more physical servers 103, each with FCOE controller 112 connected to one or more FC arrays 106 through Enhanced Ethernet (EE) switch 114 and FC gateway 116. Because Enhanced Ethernet is loss-free and provides guaranteed delivery, Enhanced Ethernet is used to carry FC packets. Server 103, which generates a FC frame, uses FCOE controller 112 (or alternatively, an Enhanced Ethernet controller supporting FCOE traffic) to pass Enhanced Ethernet frames to EE switch 114. EE switch 114 passes the FCOE frames to FC gateway 116, which strips out the FC frames and delivers them to FC array 106.

FIG. 1c illustrates exemplary proposed enterprise FCOE block storage network 105 with one or more virtual servers 118 inside a single physical server 105 and connected to a single FCOE controller 112 connected to one or more FC arrays 106 through EE switch 114 and FC gateway 116.

In addition, multi-protocol controllers have been developed for communicating over SAS, Ethernet or FC, with Peripheral Component Interconnect Express (PCIe) as the host interface. For example, U.S. patent application Ser. No. 11/433,728 entitled "Intelligent Network Processor and Method of Using Intelligent Network Processor" filed on May 11, 2006, discloses a multi-protocol controller for communicating between either FC or Ethernet and PCIe. In another example, U.S. Patent Application Publication No. 2005/0013317, which claims priority to U.S. Provisional Application No. 60/487,007, filed on Jul. 14, 2003, discloses a multi-port Ethernet controller. However, because Enhanced Ethernet is so new, there are currently no controllers that combine both SAS and Enhanced Ethernet.

SUMMARY OF THE INVENTION

Embodiments of the invention are directed to SOE controllers that integrate SAS and Enhanced Ethernet. In some embodiments, the SOE controllers can be formed within a single chip. SOE controllers provide the hardware and intelligence to allow software or firmware to perform a conversion between SAS and Enhanced Ethernet. A central intelligence block can be employed to perform the mapping between SAS and Enhanced Ethernet.

The SOE controller can include one or more Enhanced Ethernet Interfaces, one or more SAS interfaces, and a PCIe interface. The SOE controller can be used to direct the input/output (I/O) requests presented on one interface to another interface after performing some basic operations on the I/O requests, including protocol conversion. The SOE controller can include an intelligence mechanism for identifying the appropriate output ports for routing the I/O requests and redirecting them accordingly. In the case of routing I/O requests over Enhanced Ethernet, the SOE controller can perform SAS protocol conversion to map outgoing I/O requests into Enhanced Ethernet frames suitable for transmission over the Enhanced Ethernet network. SOE controllers implemented within various storage networks according to embodiments of the invention can advantageously reduce the overall cost of systems for the end user.

BRIEF DESCRIPTION OF THE DRAWINGS

FIG. 1a illustrates an exemplary conventional enterprise FC block storage network with one or more physical servers, each with a host bus adapter (HBA), connected to one or more FC arrays through a FC switch.

FIG. 1b illustrates an exemplary proposed enterprise FCOE block storage network, with one or more physical servers, each with an FCOE controller, connected to one or more FC arrays through an Enhanced Ethernet switch and a FC gateway.

FIG. 1c illustrates an exemplary proposed enterprise FCOE block storage network with one or more virtual servers inside a single physical server and connected to a single FCOE controller, the single FCOE controller connected to one or more FC arrays through an Enhanced Ethernet switch and a FC gateway.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

While SAS as a storage fabric for smaller SANs is slowly evolving, the technology does not lend itself well to a large and highly scalable storage area network, primarily due to the fact that the protocol was not built from the ground up to be a network protocol. However, Enhanced Ethernet can be adapted to carry SAS traffic. This new protocol, in which SAS is encapsulated within Enhanced Ethernet frames, may be referred to as SAS over Ethernet (SOE). Because SOE utilizes Enhanced Ethernet for transporting serial SCSI, it can overcome the switching infrastructure limitations of SAS while taking advantage of the penetration of SAS inside storage arrays. SOE therefore overcomes the drawbacks of SAS and leverages and combines the strengths of both SAS and Enhanced Ethernet.

Embodiments of the invention are directed to SOE controllers that integrate SAS and Enhanced Ethernet. In some embodiments, the SOE controllers can be formed within a single chip. SOE controllers provide the hardware and intelligence to allow software or firmware to perform a conversion between SAS and Enhanced Ethernet. A central intelligence block can be employed to perform the mapping between SAS and Enhanced Ethernet.

The SOE controller can include one or more Enhanced Ethernet Interfaces, one or more SAS interfaces, and a PCIe interface. The SOE controller can be used to direct the input/output (I/O) requests presented on one interface to another interface after performing some basic operations on the I/O requests, including protocol conversion. The SOE controller can include an intelligence mechanism for identifying the appropriate output ports for routing the I/O requests and redirecting them accordingly. In the case of routing I/O requests over Enhanced Ethernet, the SOE controller can perform SAS protocol conversion to map outgoing I/O requests into Enhanced Ethernet frames suitable for transmission over the Enhanced Ethernet network. SOE controllers implemented within various storage networks according to embodiments of the invention can advantageously reduce the overall cost of systems for the end user.

Although embodiments of the invention may be described herein in terms of SAS over Enhanced Ethernet, it should be noted that embodiments of the invention are not so limited, but can include Internet SCSI (iSCSI) and serial SCSI as well. Furthermore, although embodiments of the invention may be described herein in terms of SAS drives, it should be noted that Serial Advanced Technology Attachment (SATA) drives may also be used.

Figure 2:
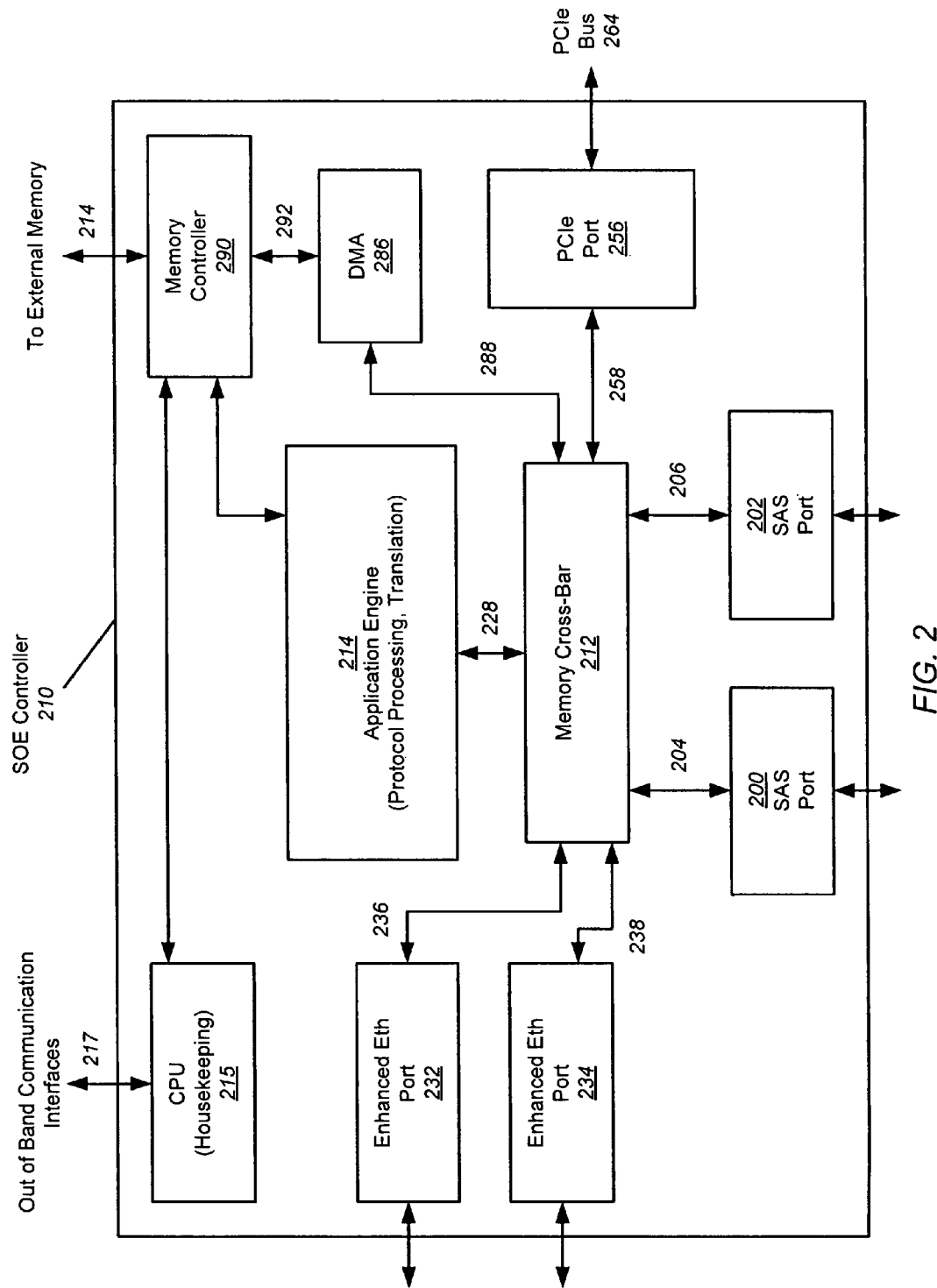
FIG. 2 is an illustration of an exemplary SOE (SAS over Enhanced Ethernet) controller implemented according to embodiments of the present invention.

FIG. 2 is an illustration of exemplary SOE controller 210 implemented according to embodiments of the present invention. SOE controller 210 may be composed of a single silicon integrated circuit die, which may be packaged inside a ceramic, metal, or plastic housing to form a unitary component. However, in other embodiments, SOE controller 210 may be separated into multiple components. SOE controller 210 includes a memory crossbar 212 which is controlled by application engine 214 through bus 228. Memory crossbar 212 may be a multi-ported shared Random Access Memory (RAM) having memory locations mapped as passages. Application engine 214 can include one or more processors for mapping the passages of crossbar locations inside memory crossbar 212. The controller 210 pre-processes received Enhanced Ethernet frames, packets, and PCIe requests before they are acted upon by the one or more processors within the application engine. Application engine 214 also parses received Enhanced Ethernet packets into their correct sequence and extracts SAS frames, or encapsulates SAS frames into Enhanced Ethernet packets.

The one or more processors within application engine 214 may be core model ARC750 as provided by ARC, Inc., which preferably each have the capability of executing 32 bit Reduced Instruction Set Computer (RISC) firmware with a clock speed of 500 MHz, and may each include 32 KB of dedicated instruction memory (not shown).

Memory crossbar 212 is connected to Enhanced Ethernet ports 232 and 234 through buses 236 and 238, respectively. Each Enhanced Ethernet port 232 is capable of communicating using the Enhanced Ethernet protocol, and may include a SERDES and a transceiver (not shown) which may be an optical transceiver for connection to fiber optic cables, or electrical transceivers for connection to electrical cables. Memory crossbar 212 is also connected to SAS ports 200 and 202 through buses 204 and 206, respectively. Each SAS port is capable of communicating using the SAS protocol, and may include a SERDES and a transceiver (not shown) which may be an optical transceiver for connection to fiber optic cables, or electrical transceivers for connection to electrical cables.

PCIe port 256 is connected to memory crossbar 212 through bus 258, and may include a SERDES for use with PCIe bus signals. PCIe port 256 is connected to PCIe bus 264 provided by a host computer (not shown). One function of PCIe port 256 is to send and receive messages in the format determined by the PCIe industry standard, including configuration inquiry responses, separating messages for lanes, and messages for implementing particular functions. PCIe bus 264 may have four or eight lanes, operating at 5 Gbps.

DMA engine and stream processor 286 is connected to memory crossbar 212 through bus 288, and is connected to memory controller 290 through bus 292. The function of controller 290 is to control the sending and receiving of data to and from an external DDR memory module (not shown) connected to bus 294 of controller 290. Controller 290 includes capabilities for providing RMW, statistics collection, XOR masking for data being transferred to or from the external DDR memory module. The data pathway through bus 292 to DMA engine and stream processor 286 and through bus 288 to memory crossbar 212 allows DMA memory operations to occur directly with controller 290 and its attached DDR memory module, without data flow through the processors within application engine 214, for data being exchanged with other sources including the PCIe capabilities accessed through bus 258 and PCIe port 256, and the Enhanced Ethernet capabilities accessed through buses 236 and 238 with Enhanced Ethernet ports 232 and 234. The ability to allow direct access for DMA operations through memory crossbar 212 with memory controller 290 saves time that would be otherwise consumed by data being transferred into and out of the processors within application engine 216. Controller 290 creates queues in the external DDR memory for storing data messages, and writes to and reads from such queues. The use of such queues, and the direct memory access to crossbar memory crossbar 212 (through buses 288 and 292, controller 290, and DMA engine and stream processor 286) effectively increases the size of memory crossbar 212, and allows more switching pathways to be created than if memory crossbar 212 were used without the external DDR memory attached to connection 294.

DMA engine 286 may also perform several data stream transformations, including but not limited to data Cyclic Redundancy Check (CRC)/checksum insertion or checking/removal, marker insertion or removal, and transferring data to/from multiple buffers.

Support CPU 215 is connected to memory controller 290, and has an external connection 217. Support CPU 215 is preferably a core model ARC750 as provided by ARC, Inc.

SOE controllers according to embodiments of the invention described above can have multiple applications as described below.

Figure 3A:
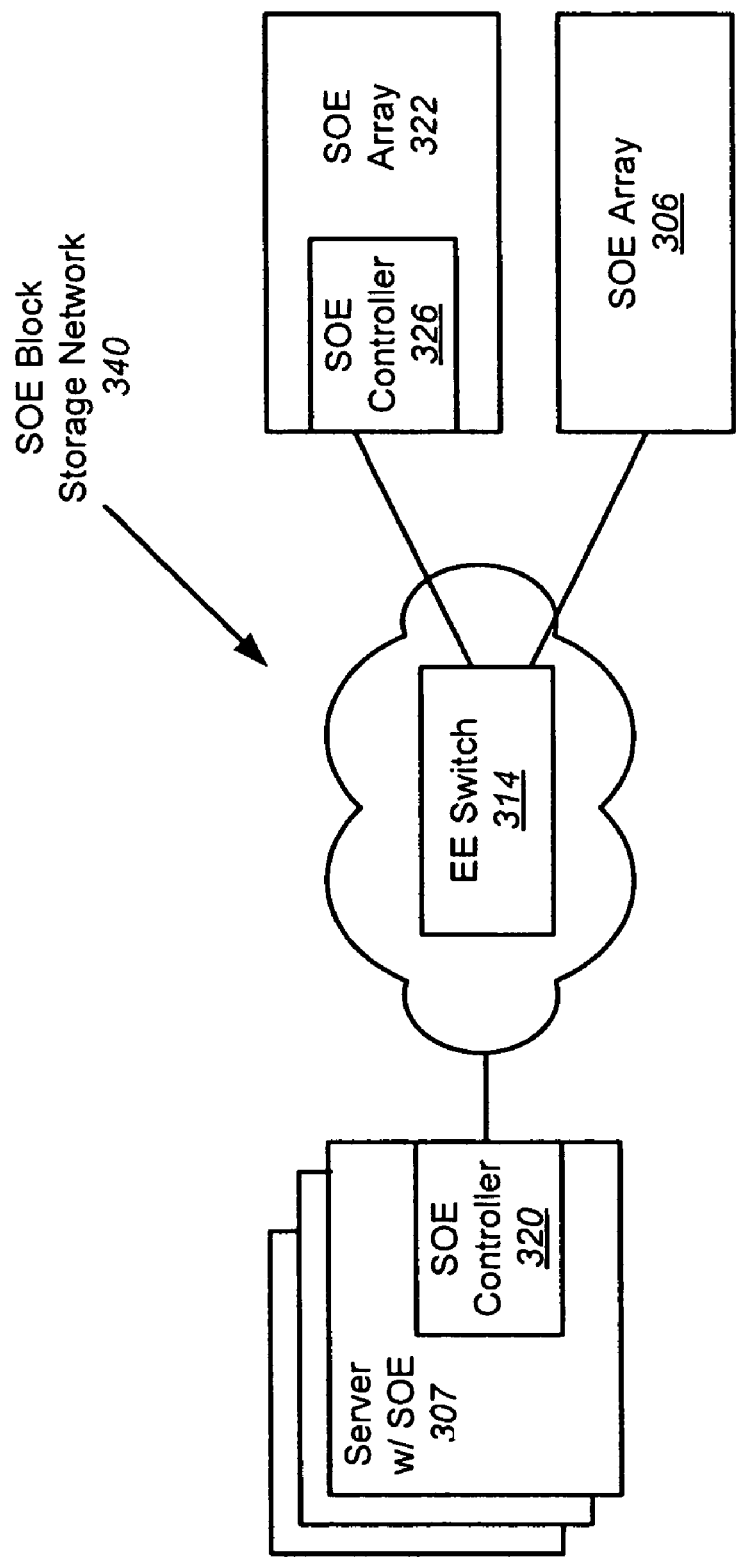
FIG. 3a illustrates an exemplary enterprise SOE block storage network with one or more physical servers, each physical server connected to a single SOE controller connected to one or more SOE arrays through an Enhanced Ethernet switch according to embodiments of the invention.

FIG. 3a illustrates exemplary enterprise SOE block storage network 340, with one or more physical servers 307, each physical server connected to a single SOE controller 320 connected to one or more SOE arrays 322 and 306 through an Enhanced Ethernet switch 314 according to embodiments of the invention. In FIG. 3a, SAS traffic is carried directly over Enhanced Ethernet to Enhanced Ethernet switch 314, then over to an SOE array containing SOE controller 326. SOE controller 326 then de-encapsulates the SAS frames from the Enhanced Ethernet frames for use in SOE array 322. FIG. 3a indicates that SOE controllers 320 and 326 can be present at both the server end and the SOE array end. FIG. 3a also shows that SOE controller 326 can be located on a plug-in card in SOE array 322, or can be part of a motherboard in SOE array 306.

Figure 3B:
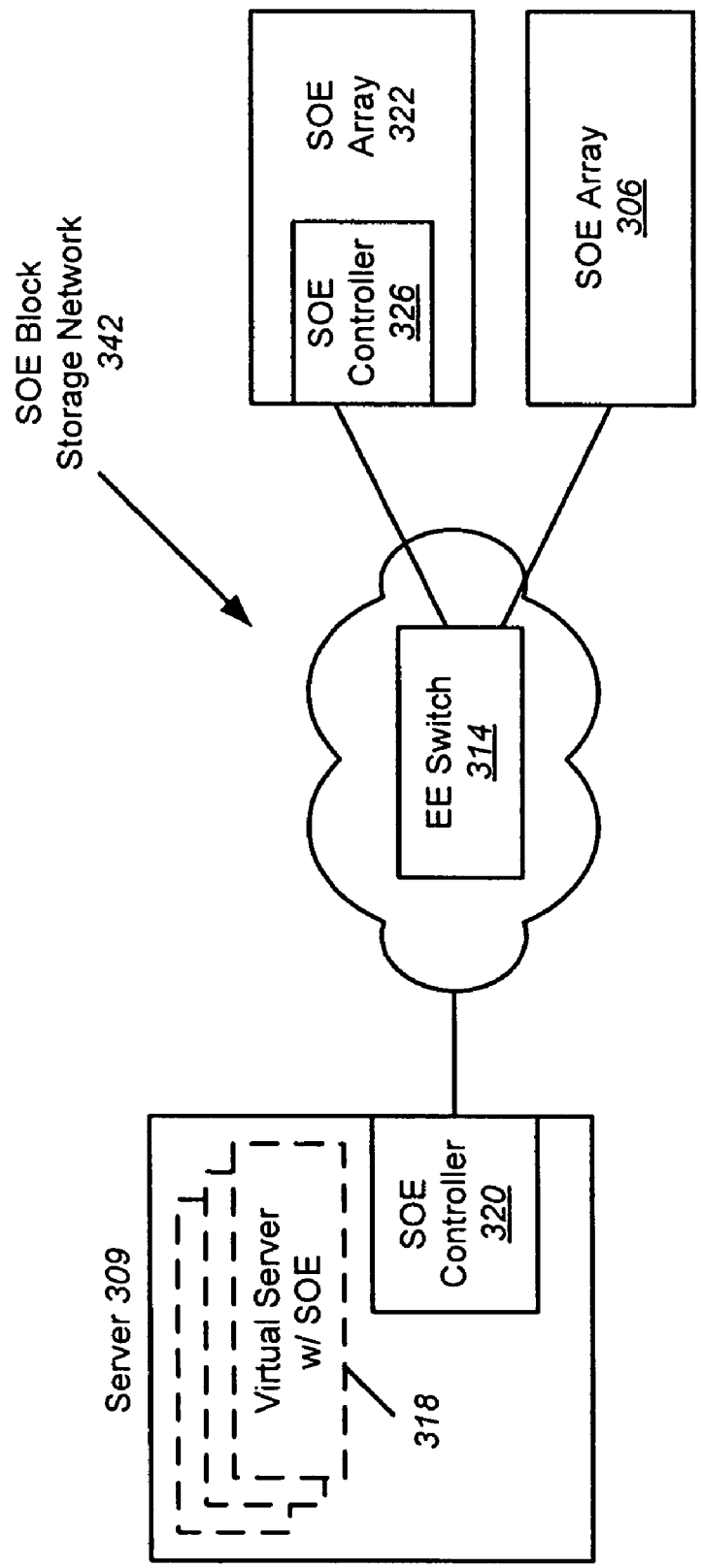
FIG. 3b illustrates an exemplary enterprise SOE block storage network with one or more virtual servers inside a single physical server connected to a single SOE controller, the SOE controller connected to one or more SOE arrays through an Enhanced Ethernet switch according to embodiments of the invention.

FIG. 3b illustrates an exemplary enterprise SOE block storage network 342, with one or more virtual servers 318 inside a single physical server 309 and connected to a single SOE controller 320 connected to one or more SOE arrays 306 and 322 through EE switch 314 according to embodiments of the invention.

Figure 4A:
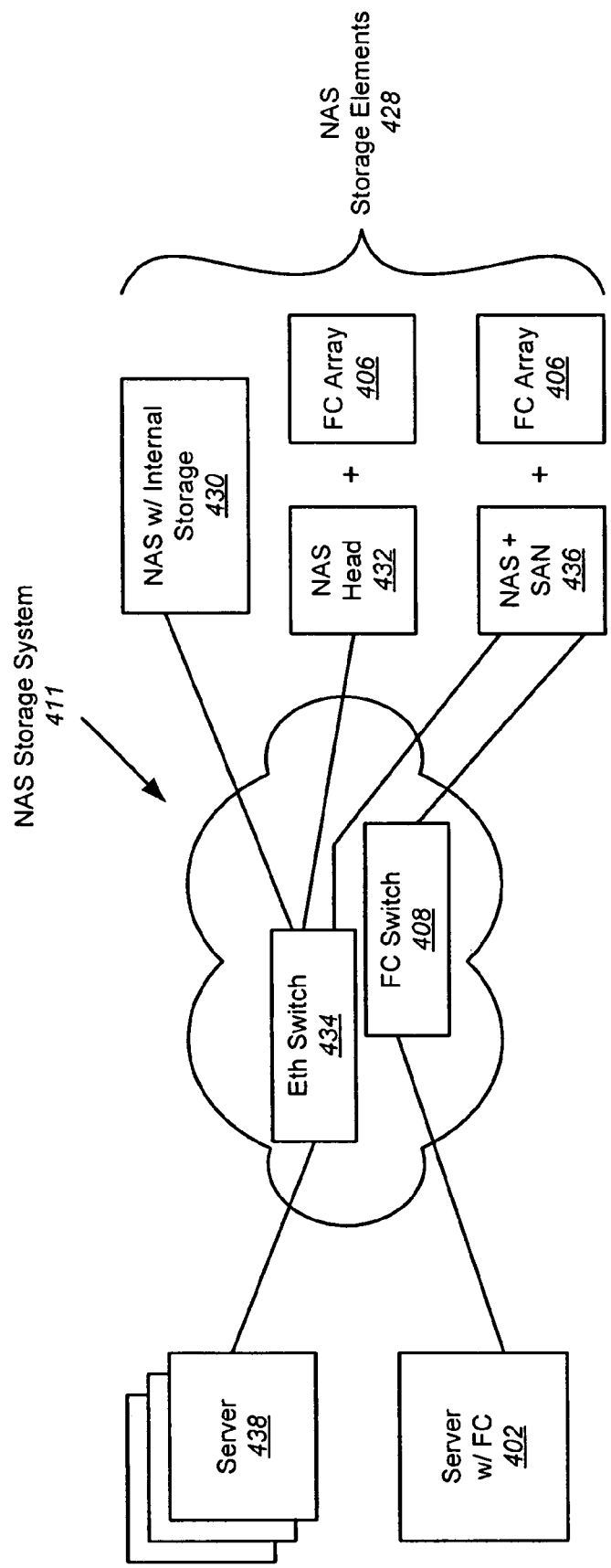
FIG. 4a illustrates an exemplary conventional enterprise network attached storage (NAS) system, with one or more servers connected to NAS storage elements.

FIG. 4a illustrates an exemplary conventional enterprise network attached storage (NAS) system 411, with one or more servers 438 connected to different types of NAS storage elements 428. In contrast to block storage using FC technology, as described above, NAS can implement Ethernet technology. A NAS storage element 428 can be assigned an IP address, and generally includes an engine or file server for implementing file services and one or more storage devices on which data is stored. Servers 438 may use a file system device driver to access data using various file access protocols. NAS storage elements 428 interpret these commands and perform the internal file and device I/O operations necessary to execute them. A NAS storage element 428 can include a NAS with internal storage 430, a NAS head 432 coupled to a FC array 406, or a NAS and SAN 436 coupled to a FC array 406. One or more servers 438 can communicate with a NAS storage element 428 through an Ethernet switch 434. Alternatively, a server with FC 402 can communicate with the NAS and SAN 436 and a FC array 406 through a FC switch 408. NAS can be enhanced to use SAS, SCSI, and Enhanced Ethernet.

Figure 4B:
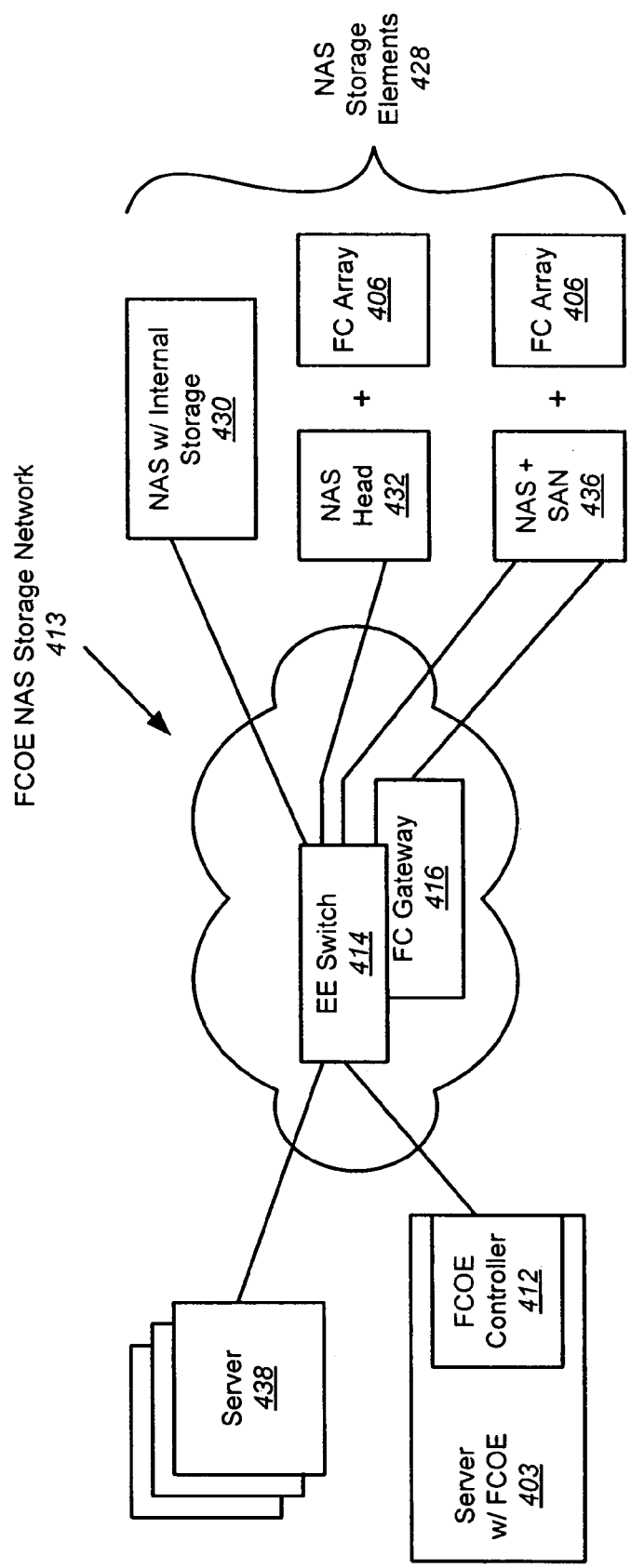
FIG. 4b illustrates an exemplary proposed enterprise FCOE NAS storage network, with one or more servers or a server with an FCOE controller connected to NAS storage elements through an Enhanced Ethernet switch and a FC gateway.

FIG. 4b illustrates exemplary proposed enterprise FCOE NAS storage network 413, with one or more servers 438 or a server 403 with FCOE controller 412 connected to NAS storage elements 428 through Enhanced Ethernet (EE) switch 414 and FC gateway 416. Because Enhanced Ethernet is loss-free and provides guaranteed delivery, Enhanced Ethernet is used to carry FC packets. The one or more servers 438 pass Enhanced Ethernet frames to Enhanced Ethernet switch 414, which forwards them to NAS storage elements 428. Alternatively, server 403, which generates FC frames, uses FCOE controller 412 to pass Enhanced Ethernet frames to Enhanced Ethernet switch 414. Enhanced Ethernet switch 414 passes the FCOE frames to FC gateway 416, which strips out the FC frames and delivers the FC frames to the NAS and SAN 436 and ultimately to FC array 406.

Figure 4C:
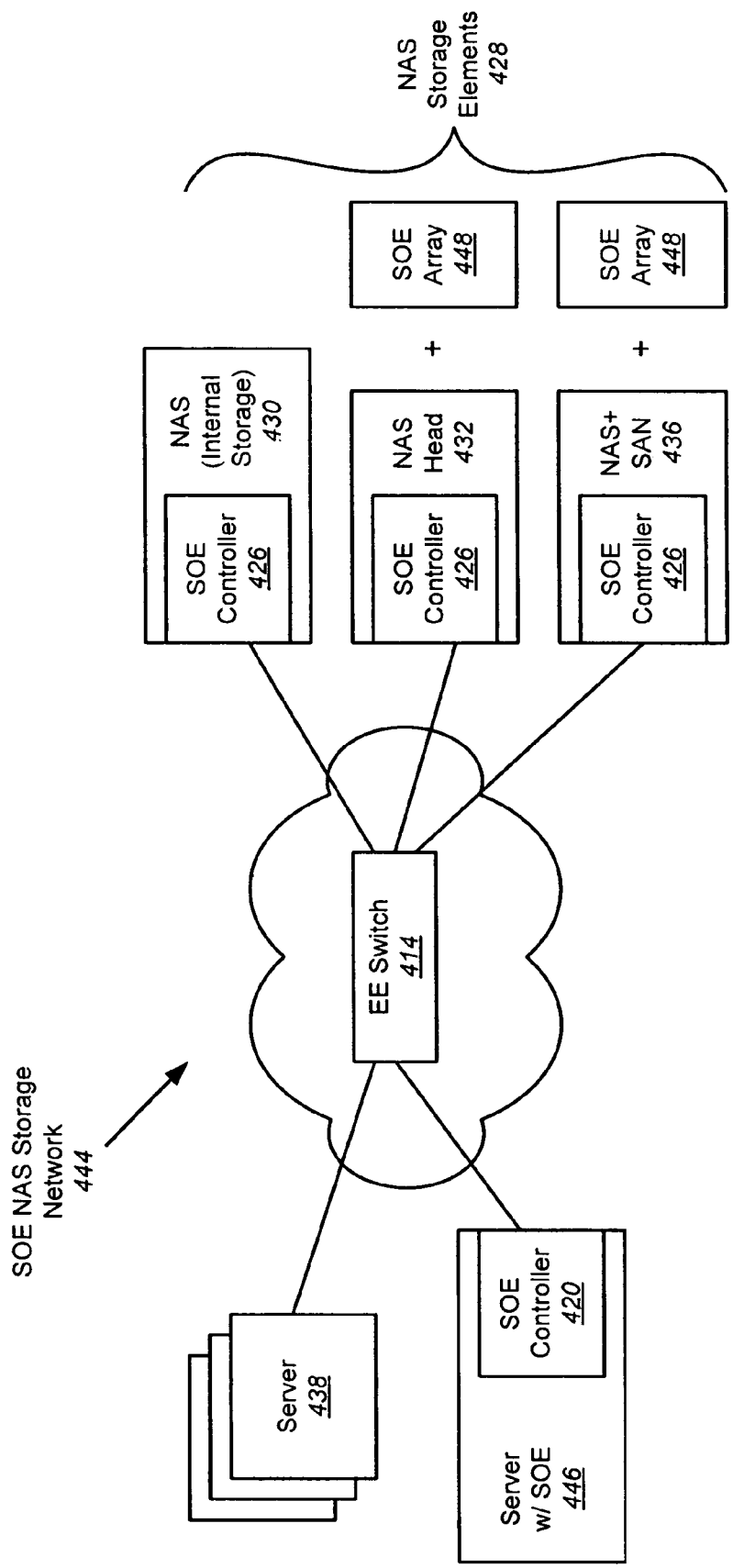
FIG. 4c illustrates an exemplary enterprise SOE NAS storage network, with one or more servers or a server with an SOE controller connected to NAS storage elements through an Enhanced Ethernet switch according to embodiments of the invention.

FIG. 4c illustrates an exemplary enterprise SOE NAS storage network 444, with one or more servers 438 or a server 446 with SOE controller 448 connected to NAS storage elements 428 through Enhanced Ethernet (EE) switch 414 according to embodiments of the invention. A NAS storage element 428 can include (1) a NAS with internal storage 430 and SOE controller 426, where the SOE controller decodes the SAS information embedded in Enhanced Ethernet Frames and forwards it to the back end which processes the SAS information, (2) a NAS head 432 including SOE controller 426 coupled to SOE array 448, where the file server functions are decoupled from the data storage functions, or (3) a NAS and SAN 436 including SOE controller 426 coupled to SOE array 448, where file server and networked storage application functions are decoupled from the data storage functions. The one or more servers 438 pass Enhanced Ethernet frames to Enhanced Ethernet switch 414, which forwards them to NAS storage elements 428. Alternatively, server 446, which generates SAS frames, uses SOE controller 448 to pass SOE frames to Enhanced Ethernet switch 414, which forwards them to NAS storage elements 428. Alternatively, server 446, which includes SOE controller 420, can be connected to NAS storage elements 428 through an Enhanced Ethernet switch 414. Using SOE controller 420, SAS traffic is carried directly over Enhanced Ethernet to Enhanced Ethernet switch 414, then over to a NAS storage element 428 containing SOE controller 426. SOE controller 426 then de-encapsulates the SAS frames from the Enhanced Ethernet frames for use in NAS storage elements 428.

Figure 5A:
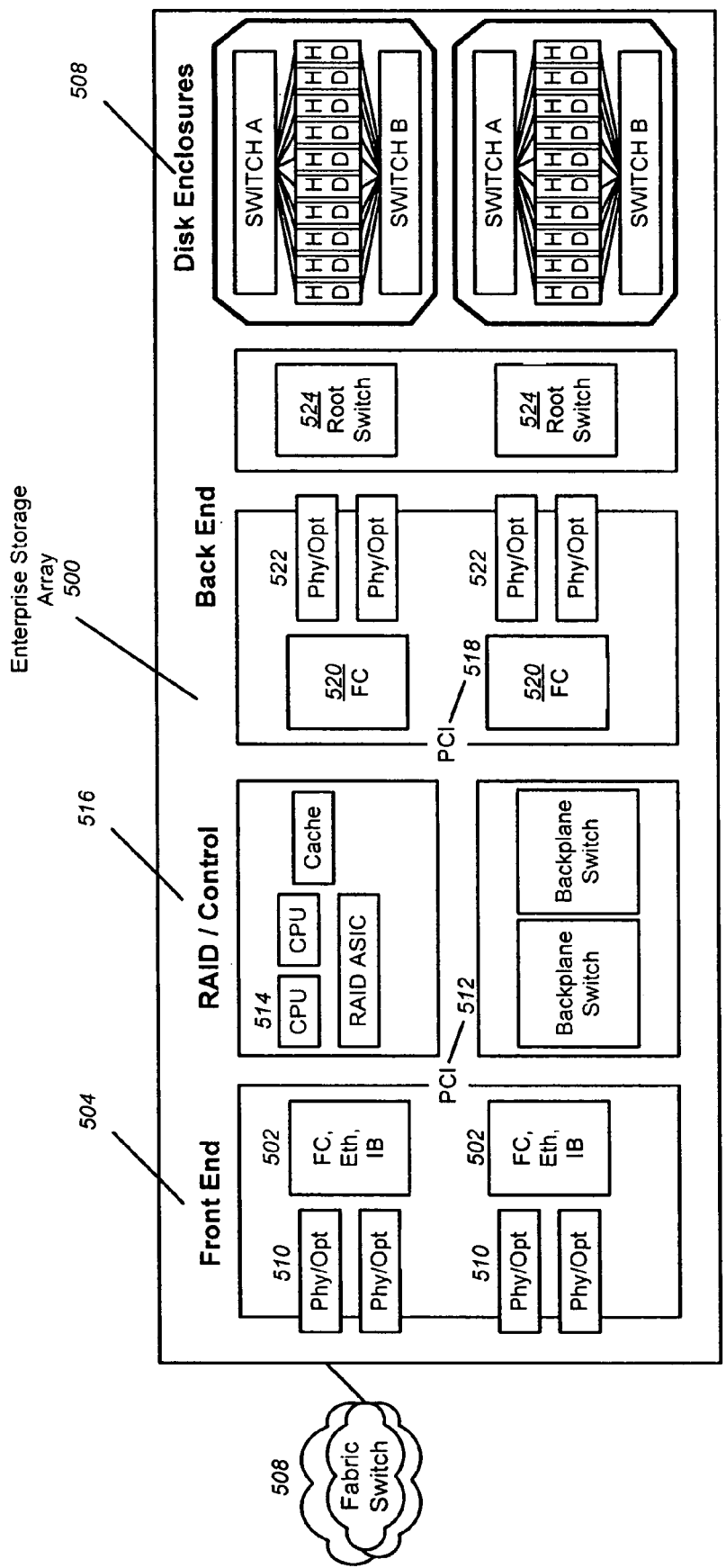
FIG. 5a illustrates an exemplary conventional Enterprise storage array.

FIG. 5a illustrates an exemplary conventional Enterprise storage array 500. The Enterprise storage array 500 of FIG. 5a may correspond to FC array 106 of FIGS. 1a-1c. A FC, Ethernet or Infiniband (IB) controller 502 can be employed at front end 504 for providing an interface to their respective fabrics 506 using that technology.

When SCSI commands are to be sent from a server to a disk in enclosure 508, a FC HBA in the server sends FC frames encapsulating the SCSI commands out over fabric 506 to Enterprise storage array 500, where they are received in one of the Phy/optical interfaces 510 on the Enterprise storage array. The FC frames are then routed to controller 502 where they are de-encapsulated and passed over a Peripheral Component Interconnect (PCI) bus 512 to a processor 514 in RAID control block 516, which performs the RAID function and creates multiple commands to satisfy the received SCSI command. The created commands may be SCSI commands to be sent to one or more disk drives within enclosures 508.

The SCSI commands are then passed from the processor 514 over a custom interface 518 (which may include, but is not limited to a PCI bus) to a FC controller 520. SCSI commands from processor 514 are then encapsulated into FC frames and sent out through a Phy/optical interface 522 to root switch 522 and enclosure 508.

Figure 5B:
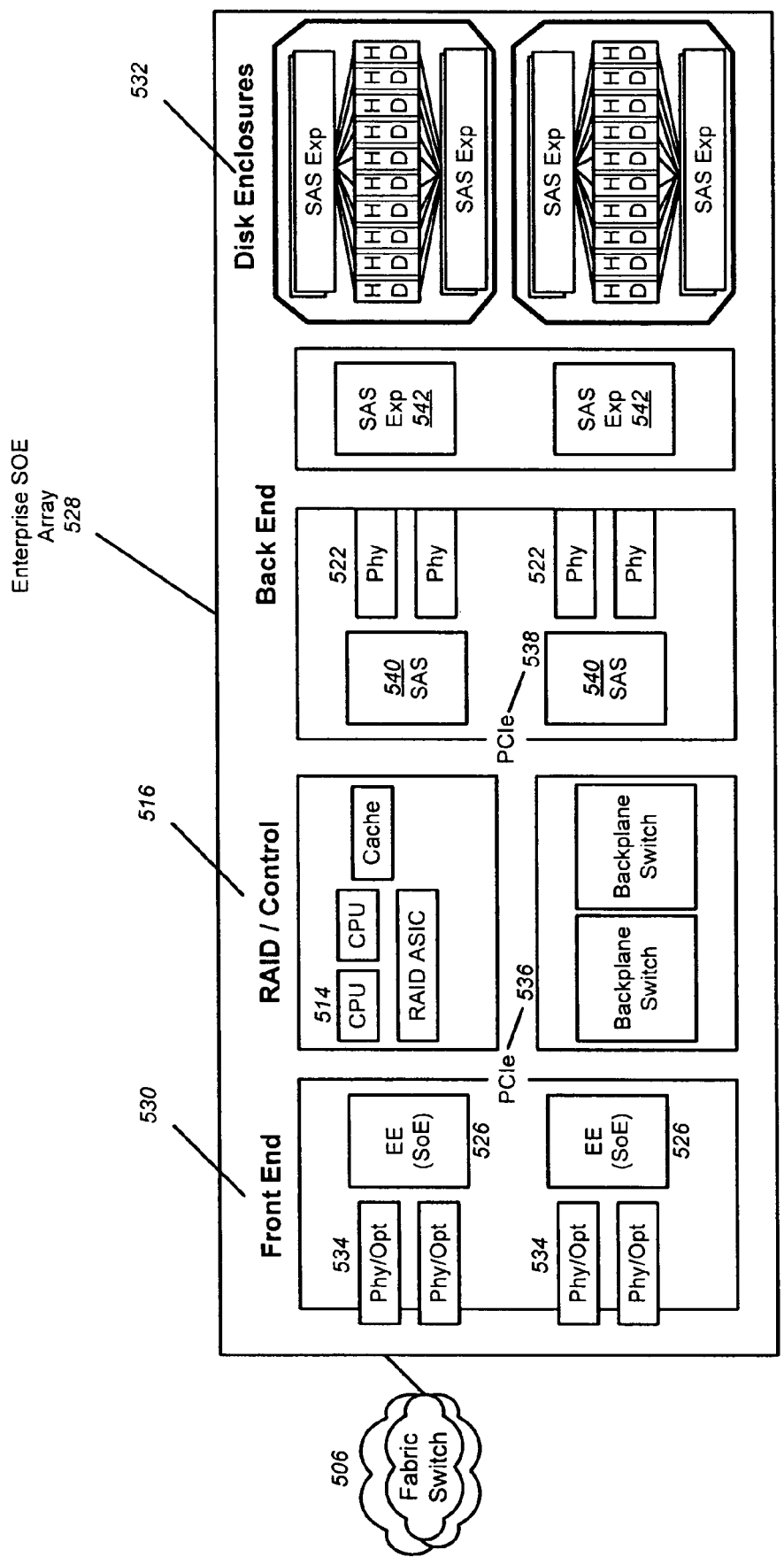
FIG. 5b illustrates an exemplary Enterprise SOE array according to embodiments of the invention.

FIG. 5b illustrates an exemplary Enterprise SOE array 528 according to embodiments of the invention. The Enterprise SOE array 528 of FIG. 5a may correspond to SOE array 322 or 306 of FIGS. 3a and 3b. An SOE controller 526 can be employed at front end 530 for providing an interface to fabric 506.

When SAS commands are to be sent from a server to a disk in enclosure 532, a SOE controller in the server sends Enhanced Ethernet frames encapsulating the SAS commands out over fabric 506 to Enterprise SOE array 528, where they are received in one of the Phy/optical interfaces 534 on the Enterprise SOE array. The Enhanced Ethernet frames are then routed to SOE controller 526 where they are de-encapsulated and passed over PCIe bus 536 to a processor 514 in RAID control block 516, which performs the RAID function and creates multiple commands to satisfy the received SAS command. SOE controller 526 therefore replaces the FC, Ethernet or IB controller to connect directly to processor 514 on the back side. The created commands may be SAS commands to be sent to one or more disk drives within enclosures 532.

The SAS commands are then passed from the processor 514 over a custom interface 538 (which may include, but is not limited to a PCIe bus) to SAS controller 540. SAS commands from processor 514 are then encapsulated into SAS frames and sent out through a Phy/optical interface 522 to SAS expander 542 and enclosure 532.

Figure 6A:
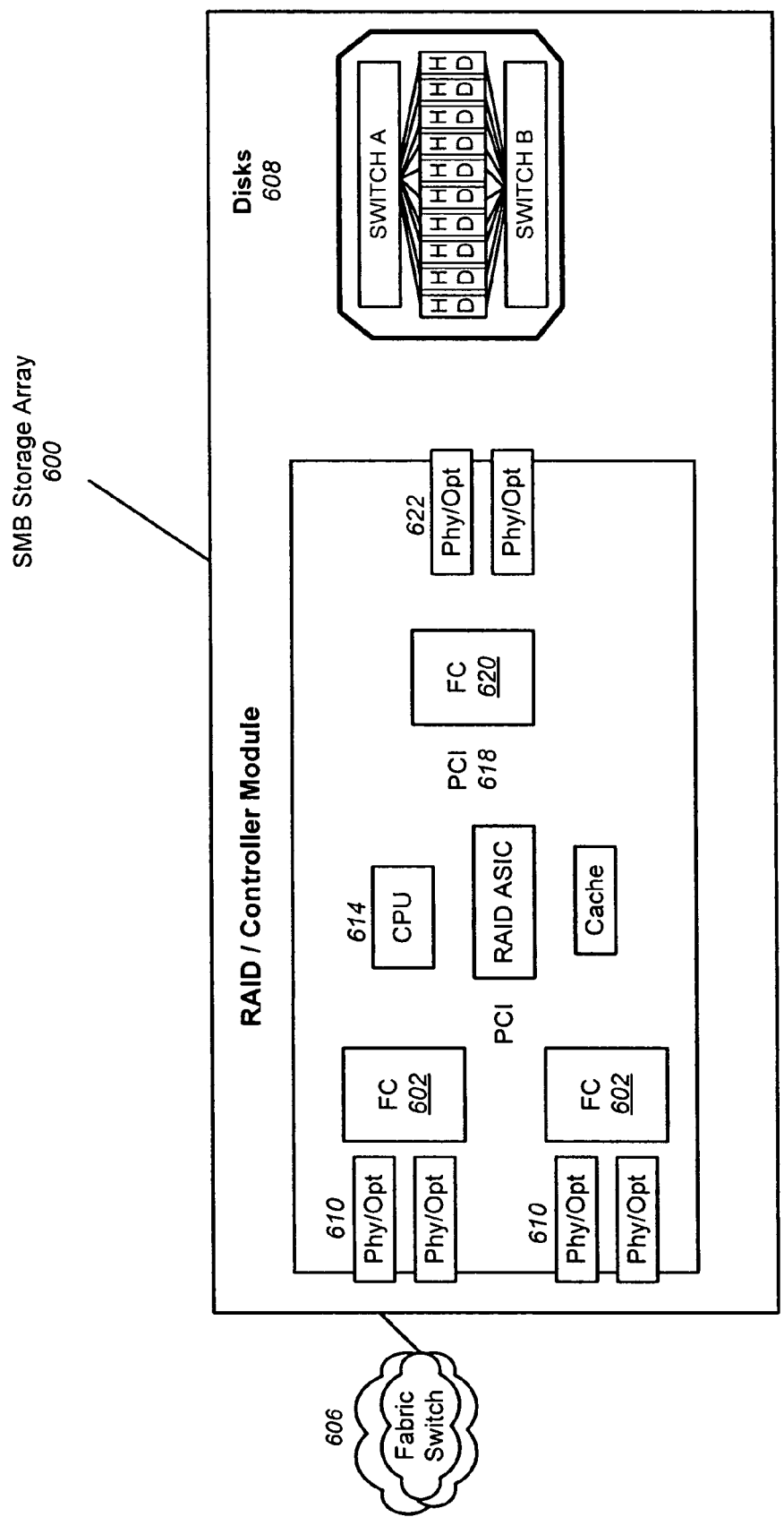
FIG. 6a illustrates an exemplary conventional small or medium business (SMB) storage array.

FIG. 6a illustrates an exemplary conventional small or medium business (SMB) storage array 600. SMB storage array 600 is a scaled down version of an Enterprise storage array, and can be low cost. The SMB storage array 600 of FIG. 6a may correspond to FC array 106 of FIGS. 1a-1c. A FC controller 602 can be employed for providing an interface to fabric 606.

When SCSI commands are to be sent from a server to a disk in enclosure 608, a FC HBA in the server sends FC frames encapsulating the SCSI commands out over fabric 606 to Enterp rise storage array 600, where they are received in one of the Phy/optical interfaces 610 on the SMB storage array. The FC frames are then routed to controller 602 where they are de-encapsulated and passed over a PCI bus 512 to a processor 614, which performs the RAID function and creates multiple commands to satisfy the received SCSI command. The created commands may be SCSI commands to be sent to one or more disk drives within enclosures 608.

The SCSI commands are then passed from the processor 614 over a custom interface 618 (which may include, but is not limited to a PCIe bus) to a FC controller 620. SCSI commands from processor 614 are then encapsulated into FC frames and sent out through a Phy/optical interface 622 to renclosure 608.

Figure 6B:
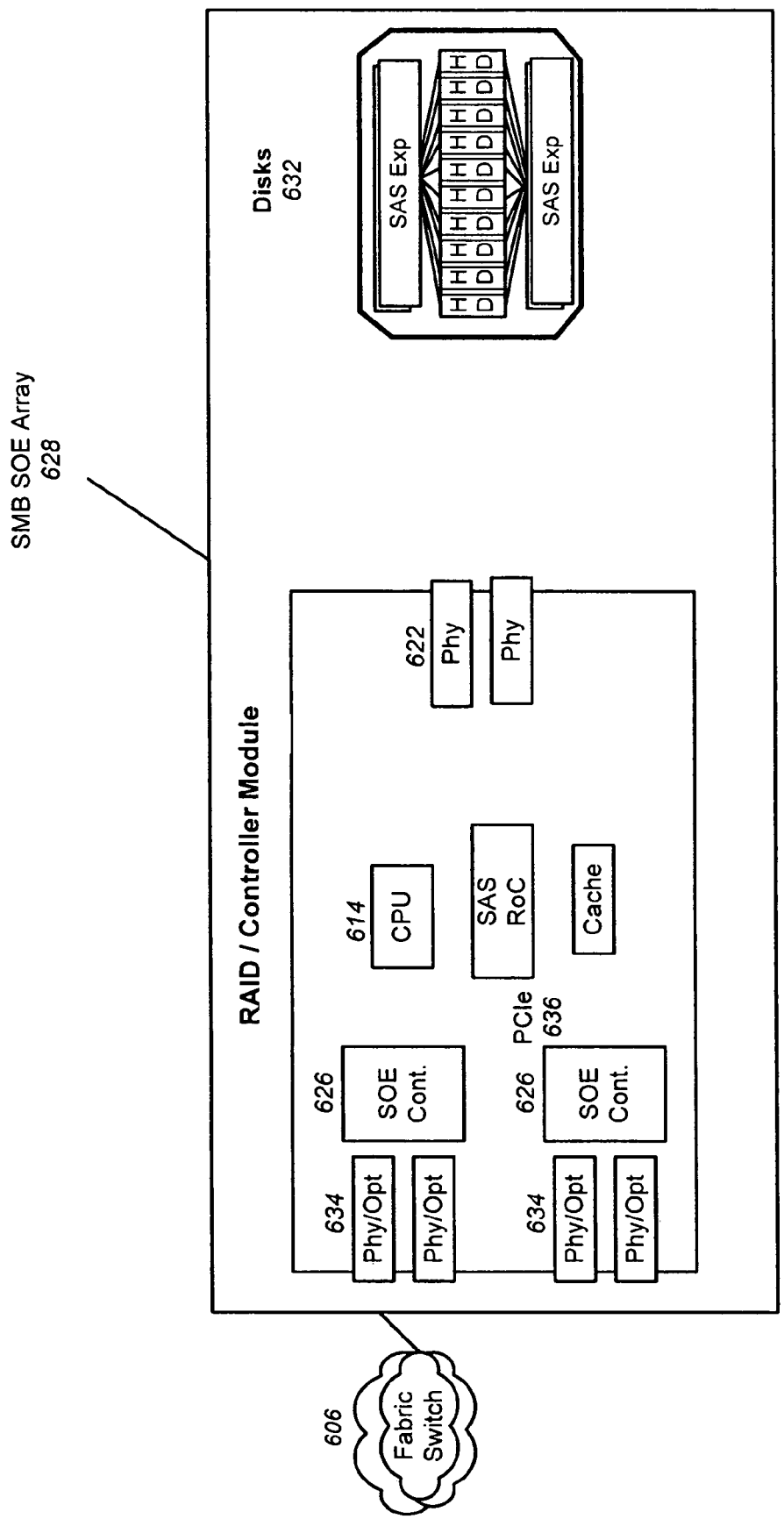
FIG. 6b illustrates an exemplary SMB SOE array according to embodiments of the invention.

FIG. 6b illustrates an exemplary SMB SOE array 628 according to embodiments of the invention. The SMB SOE array 628 of FIG. 6a may correspond to SOE array 322 or 306 of FIGS. 3a and 3b. An SOE controller 626 can be employed for providing an interface to fabric 606.

When SAS commands are to be sent from a server to a disk in enclosure 632, an SOE controller in the server sends Enhanced Ethernet frames encapsulating the SAS commands out over fabric 606 to SMB SOE array 628, where they are received in one of the Phy/optical interfaces 634 on the Enterprise SOE array. The Enhanced Ethernet frames are then routed to SOE controller 626 where they are de-encapsulated and passed over PCIe bus 636 to a processor 614, which performs the RAID function and creates multiple commands to satisfy the received SAS command. SOE controller 626 therefore replaces the FC controller to connect directly to processor 614. The created commands may be SAS commands to be sent to one or more disk drives within enclosures 632. The SAS commands are then encapsulated into SAS frames and sent out through a Phy/optical interface 622 to enclosure 632.

The main difference between FIG. 6b and FIG. 5b is the amount of functionality that is supported on the array. The number of disks that can be supported in the Enterprise SOE array of FIG. 5b can be significantly larger than the number of disks supported in the SMB SOE array of FIG. 6b. To support a large number of disk drives, as in FIG. 5b, multiple controllers (e.g. front-end SOE controller 526, CPU 514, and back-end SAS controller 540) must be employed to service a large number of disk drives. In contrast, in FIG. 6b, there are no back-end controllers because a large number of drives are not being serviced.

Figure 7:
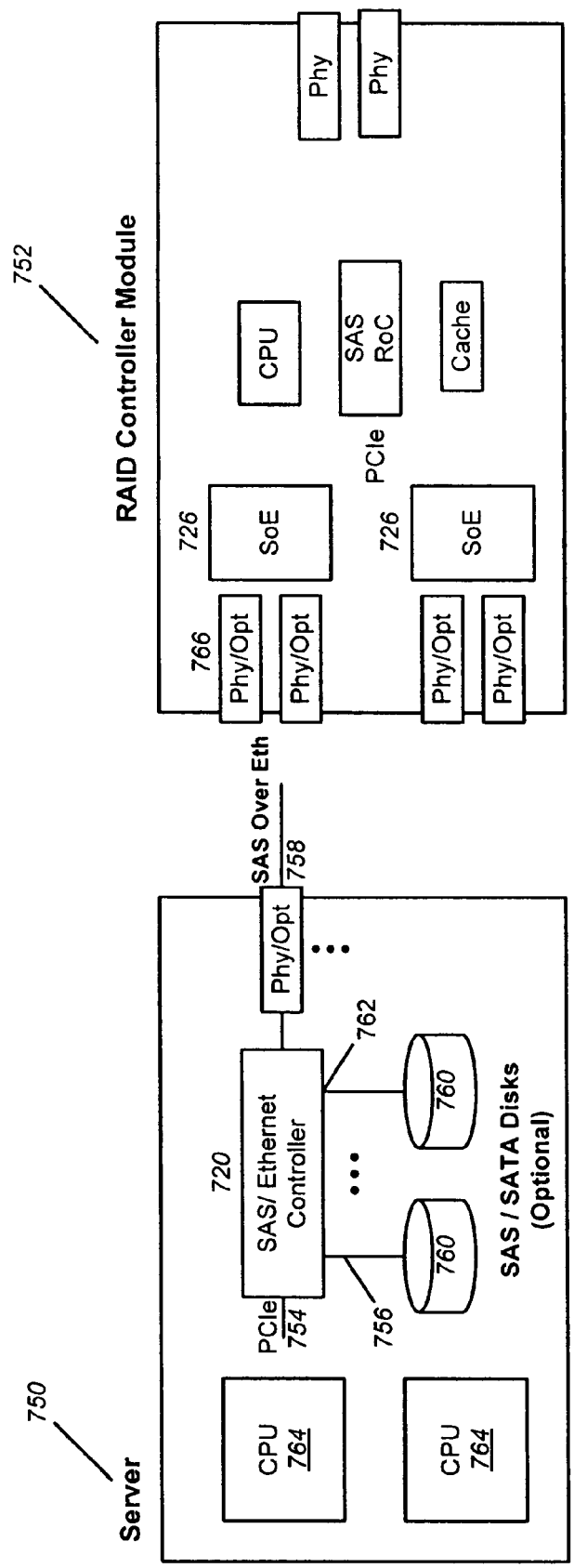
FIG. 7 illustrates exemplary SOE controllers in a server and in a RAID controller module, respectively, according to embodiments of the invention.

FIG. 7 illustrates exemplary SOE controllers 720 and 726 in server 750 and in RAID controller module 752, respectively, according to embodiments of the invention. Note that the SOE controllers 720 and 726 can be implemented in separate integrated circuits to enable each chip to be optimized for its own functionality and power requirements. Alternatively, SOE controllers 720 and 726 can be a dual-purpose chip, configurable to perform either function.

In the server implementation 750 of FIG. 7, which may correspond to servers 307 or 318 in FIGS. 3a and 3b or server 446 in FIG. 4c, there may be multiple CPUs 764 connected to one PCIe port or interface 754, one or more SAS interfaces 756 (e.g. two 6 Gbps SAS interfaces), and one or more Enhanced Ethernet ports or interfaces 758 (e.g. 10 Gigabit Enhanced Ethernet interface). In some embodiments, SAS or SATA disks 760 can be connected directly to SOE controller 720 within server 750. However, in other embodiments, servers 750 may only have access to external disks over the network. SOE controller 720 therefore provides interfaces/mechanisms for server 750 to connect to local SAS device(s) 760 and to SAS devices across the Enhanced Ethernet Network. In order to support such an application, SOE controller 720 and associated software can support the discovery of local SAS devices 760 as well as the discovery of SAS devices across the Enhanced Ethernet Network. The typical I/O presented to SOE controller 720 across PCIe interface 754 can have two potential routes. If the I/O is directed to a local SAS drive 760, the I/O is delivered to a SAS engine within SOE controller 720 that prepares the I/O for transmission over the SAS Link and Phy layers. If the I/O is for a Serial SCSI or a SAS device across the Enhanced Ethernet Network, the I/O is mapped to the Enhanced Ethernet frame format along with the corresponding address mappings and transmitted over the Enhanced Ethernet Interface. Therefore, SOE controller 720 can intelligently direct an I/O command either to local disks 760 within server 750 or to the external disks depending on how the server is configured, in a manner that is transparent to the application running on CPU 764. This can provide a cost benefit to server manufacturers, because different variants of controllers and software, one for local disks, and one for external disks, is not necessary.

The RAID controller implementation 752 of FIG. 7, corresponds to the RAID controller shown in FIG. 6b and described above. In this implementation, there can be one or more Enhanced Ethernet interfaces 766 (e.g. two 10Gigabit Enhanced Ethernet interfaces), and one PCIe interface 768.

Figure 8:
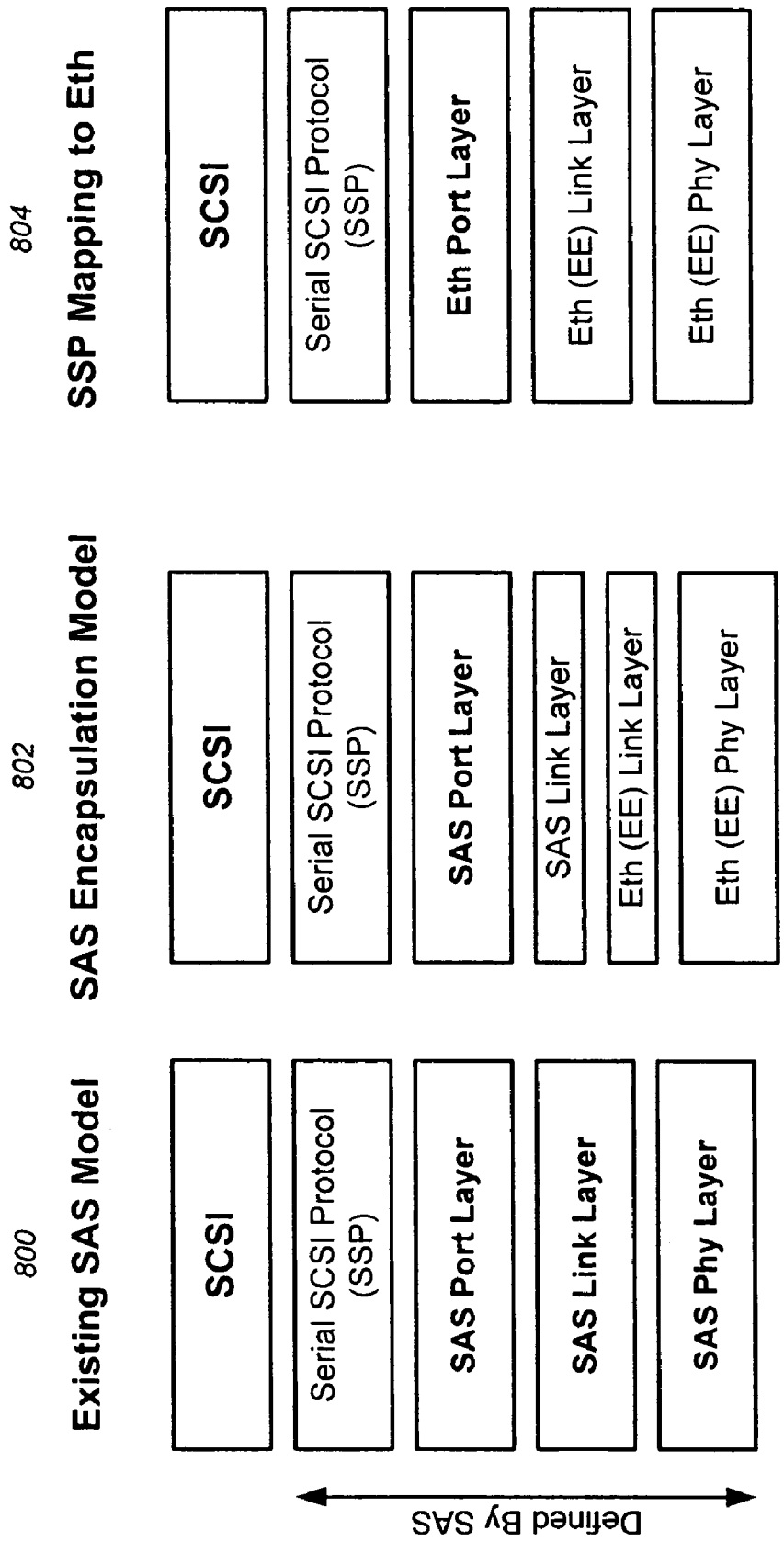
FIG. 8 illustrates a conventional SAS layer stack and two exemplary SOE layer stacks according to embodiments of the invention.

FIG. 8 illustrates a conventional SAS layer stack 800 and two exemplary SOE layer stacks 802 and 804 according to embodiments of the invention. The software for converting between SAS and Enhanced Ethernet may use the two options 802 and 804 shown in FIG. 8. In option 802, the SAS-Enhanced Ethernet conversion or translation (mapping of SAS to EE frames and vice versa) is performed at the SAS link layer, where the SAS link layer frames will be mapped to the Enhanced Ethernet link layer frames before being sent out on the physical interface. In option 804, the SAS-Enhanced Ethernet conversion is performed at the port layer. In option 804, the conversion can occur at a much earlier stage, and immediately after the serial SCSI protocol layer, data frames can be mapped to the Enhanced Ethernet frames. Option 804 can be advantageous because there is no SAS link layer processing, and hence could be faster.

In mid-tier array environments, the SOE controller can also act as a front-end controller which exposes Enhanced Ethernet Interface to the network. The incoming traffic is subjected to protocol conversion (from Enhanced Ethernet Frame Format to Serial SCSI Format) and the resulting I/O traffic is sent across the PCIe interface to the external RAID processor. Depending on the specific application, the actual configuration of the SOE controller can be varied as shown in the exemplary configurations listed below, although it should be understood that other configurations are also possible:

| Server | Server & Mid-Tier Arrays |
|---|---|
| 1x 10Gig Enhanced Ethernet | 2x 10Gig Enhanced Ethernet |
| 1x 6G SAS | 2x 6G SAS |
| X4 PCIe Gen 2 | X8 PCIe Gen 2 |
| Supports SSP over Enhanced Ethernet | Supports SSP over Enhanced Ethernet |

Although the present invention has been fully described in connection with embodiments thereof with reference to the accompanying drawings, it is to be noted the various changes and modifications will become apparent to those skilled in the art. Such changes and modifications are to be understood as being included within the scope of the present invention as defined by the appended claims.

What is claimed is:

1. A Serial-attached SCSI (SAS) over Enhanced Ethernet (SOE) controller, comprising:
an application engine configured for converting between SAS protocols and Enhanced Ethernet protocols by receiving SAS frames from the SAS ports and encapsulating the received SAS frames into one or more Enhanced Ethernet frames to be transmitted by the Enhanced Ethernet ports to the Enhanced Ethernet network and receiving Enhanced Ethernet frames from the Enhanced Ethernet ports and de-encapsulating SAS frames encapsulated in the received Enhanced Ethernet frames, the de-encapsulated SAS frames to be communicated by the SAS ports to the SAS and SATA devices, the application engine further configured for automatically routing traffic to SAS devices over the one or more SAS ports or routing the traffic to SAS devices across the Enhanced Ethernet network over the one more Enhanced Ethernet ports in a manner that is transparent to a host application;
a Peripheral Component Interconnect Express (PCIe) port coupled to the application engine for communicating with devices over a PCIe bus;
one or more SAS ports coupled to the application engine for communicating with SAS and Serial Advanced Technology Attachment (SATA) devices; and
one or more Enhanced Ethernet ports coupled to the application engine for transmitting and receiving Enhanced Ethernet frames over an Enhanced Ethernet network,
wherein the SOE controller is an easy plug-in component in both a server end and a storage array end for integrating the SAS and Enhanced Ethernet networks.

2. The SOE controller of claim 1, the SOE controller configured for pre-processing received Enhanced Ethernet frames, packets and PCIe requests before they are acted upon by the application engine.

3. The SOE controller of claim 1, the application engine further configured for parsing received Enhanced Ethernet packets into their correct sequence and extracting SAS frames, and encapsulating SAS frames into Enhanced Ethernet packets.

4. The SOE controller of claim 1, further comprising a crossbar controlled by the application engine for making connections between the ports.

5. The SOE controller of claim 1, incorporated into a single integrated circuit.

6. A server comprising the SOE controller of claim 1.

7. An enterprise SOE block storage network comprising the server of claim 6.

8. An enterprise SOE network attached storage (NAS) storage network comprising the server of claim 6.

9. The SOE controller of claim 1, the SOE controller coupled to a plurality of virtual servers through the PCIe port.

10. An enterprise SOE block storage network comprising the SOE controller and the plurality of virtual servers of claim 9.

11. The SOE controller of claim 1, the SOE controller coupled within an SOE array to a RAID processor through the PCIe port.

12. An enterprise SOE block storage network comprising the SOE array of claim 11.

13. Network attached storage (NAS) comprising the SOE controller of claim 1, the NAS including internal storage.

14. A network attached storage (NAS) head comprising the SOE controller of claim 1 and coupled to an external SOE array.

15. A network attached storage (NAS) and storage area network (SAN) comprising the SOE controller of claim 1 and coupled to an external SOE array.

16. The SOE controller of claim 10, the RAID processor coupled to a SAS controller in a back end of the SOE array, the SOE array forming an Enterprise SOE array.

17. The SOE controller of claim 10, the RAID processor coupled to a SAS expander in the SOE array, the SOE array forming a small and medium business (SMB) SOE array.

18. The enterprise SOE block storage network of claim 7, further comprising a second SOE controller coupled within an SOE array to a RAID processor through a PCIe port of the second SOE controller.

19. The enterprise SOE block storage network of claim 10, further comprising a second SOE controller coupled within an SOE array to a RAID processor through a PCIe port of the second SOE controller.

20. The enterprise SOE NAS storage network of claim 8, further comprising a second SOE controller coupled within an SOE array to a RAID processor through a PCIe port of the second SOE controller.

21. A Serial-attached SCSI (SAS) over Enhanced Ethernet (SOE) controller, comprising:
    means for converting between SAS protocols and Enhanced Ethernet protocols, the conversion means further comprising means for encapsulating SAS frames into one or more Enhanced Ethernet frames to be transmitted to an Enhanced Ethernet network and means for de-encapsulating SAS frames encapsulated within Enhanced Ethernet frames received from the Enhanced Ethernet network;
    means for automatically routing traffic to SAS devices over the one or more SAS ports or routing the traffic to SAS devices across the Enhanced Ethernet network over the one more Enhanced Ethernet ports in a manner that is transparent to a host application;
    means for communicating with devices over a PCIe bus;
    means for communicating SAS frames with SAS and Serial Advanced Technology Attachment (SATA) devices; and
    means for transmitting and receiving Enhanced Ethernet frames over an Enhanced Ethernet network,
    wherein the SOE controller is an easy plug-in component in both a server end and a storage array end for integrating the SAS and Enhanced Ethernet networks.

22. A method for communicating Serial-attached SCSI (SAS) frames over an Enhanced Ethernet network via a Serial-attached SCSI (SAS) over Enhanced Ethernet (SOE) controller, comprising:
    receiving a command over a Peripheral Component Interconnect Express (PCIe) port;
    converting the command to SAS frames;
    transmitting the SAS frames over a SAS port if the received command is destined for a local SAS drive connected to that SAS port;
    encapsulating the SAS frames within Enhanced Ethernet frames and transmitting the SAS frames encapsulated within the Enhanced Ethernet frames over the Enhanced Ethernet network if the received command is destined for a SAS drive across the Enhanced Ethernet network; and
    automatically routing the SAS frames to SAS devices over the one or more SAS ports or routing the SAS frames encapsulated in Enhanced Ethernet frames to SAS devices across the Enhanced Ethernet network in a manner that is transparent to a host application,
    wherein the SOE controller is an easy plug-in component in both a server end and a storage array end for integrating the SAS and Enhanced Ethernet networks.

23. The method of claim 22, further comprising parsing received Enhanced Ethernet packets into their correct sequence and extracting SAS frames, and encapsulating SAS frames into Enhanced Ethernet packets.

24. The method of claim 22, further comprising utilizing a controllable crossbar for making connections between the ports.

* * * * *